United States Patent [19]
Abbott

[11] 3,978,742
[45] Sept. 7, 1976

[54] EPICYCLIC GEAR ASSEMBLIES

[75] Inventor: Randle Leslie Abbott, Tamworth, England

[73] Assignee: GKN Transmissions Limited, Birmingham, England

[22] Filed: Oct. 23, 1974

[21] Appl. No.: 517,196

[30] Foreign Application Priority Data
Nov. 8, 1973 United Kingdom............... 51782/73
Apr. 24, 1974 United Kingdom............... 17844/74

[52] U.S. Cl. ................................. 74/751; 74/781 R
[51] Int. Cl.² ....................... F16H 3/74; F16H 57/10
[58] Field of Search................ 74/781 R, 766, 767, 74/760, 761, 762, 763, 750 R, 751, 801

[56] References Cited
UNITED STATES PATENTS
2,644,550  7/1953  Flinn............................. 74/781 R X
3,295,394  1/1967  Whateley...................... 74/781 R
3,382,736  5/1968  Abbott........................... 74/781 R
3,487,726  1/1970  Burnett.......................... 74/781 R
3,590,660  7/1971  Bopp............................. 74/781 R FOREIGN PATENTS OR APPLICATIONS
699,020  12/1964  Canada........................... 74/781 R Primary Examiner—Samuel Scott
Assistant Examiner—Lance W. Chandler
Attorney, Agent, or Firm—Friedman & Goodman

[57] ABSTRACT

An epicyclic gear change assembly capable of giving a planetary ratio and direct drive and having first means for frictionally connecting two members of epicyclic gearing together for direct drive and second means for positively connecting two members of the gearing together for direct drive so that if the first means is engaged while the gearing is stationary and tends to slip when the gearing starts to be driven, the second means automatically comes into operation to inhibit such slipping.

6 Claims, 3 Drawing Figures

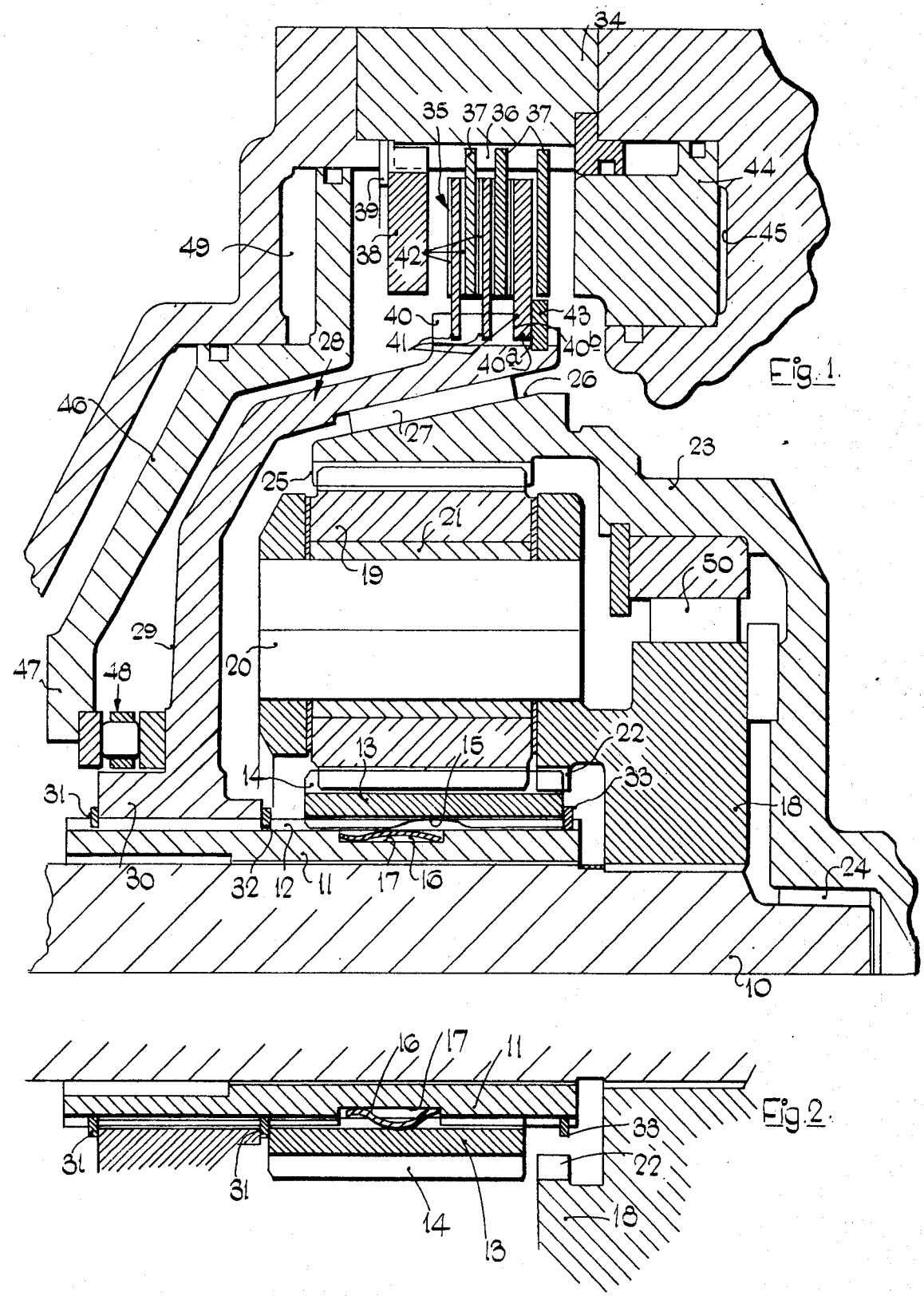

EPICYCLIC GEAR ASSEMBLIES

BACKGROUND OF THE INVENTION

1. Field of the Invention

This invention relates to epicyclic gear change assemblies which have two ratios, a direct drive or unit ratio and an overdrive or underdrive ratio. Such epicyclic gear change assemblies are commonly used as auxiliary ratio change means in motor vehicles and are normally, but not exclusively, arranged to give a direct drive ratio and an overdrive ratio.

The invention will be described in relation to an epicyclic gear change assembly capable of giving a direct drive ratio and an overdrive ratio but the invention is applicable to epicyclic gear change assemblies arranged to give direct and underdrive ratios and also to epicyclic gear change assemblies for purposes other than use as an auxiliary ratio change means in a motor vehicle but in which it is required to obtain a direct drive or unit ratio and a planetary ratio.

2. Description of the Prior Art

In presently known epicyclic gear change assemblies direct drive is normally obtained by the engagement of a friction clutch which runs in the lubricating oil of the assembly and which clutches together two members of the gearing. For overdrive ratio the clutch is disengaged and the reaction member of the gearing, normally the sun gear, is held stationary by means of a brake.

If such an epicyclic gear change assembly is being used as an auxiliary ratio change means in a motor vehicle having a main change speed gear box and if the assembly includes a one-way clutch between the input and output members of the assembly, or between the reaction member and the casing of the assembly, then the arrangement will be such that when reverse gear is selected in the main change speed gear box the epicyclic gear change assembly will be in direct drive. If the vehicle is brought to rest with the overdrive ratio engaged and then reverse is selected in the main change speed gear box, the epicyclic gear change assembly must move over to direct drive with the vehicle stationary. There is thus no relative rotation between the parts of the friction clutch which is engaged for direct drive and the oil in which the clutch runs will not be wiped off the clutch surfaces as occurs if the clutch is engaged while the parts thereof are rotating. Consequently, as soon as drive is commenced, the clutch will slip.

Normally, the clutch is engaged by a spring force but in some designs the engaging force of the spring is augmented by thrust generated by providing the gears of the gearing with teeth of a helical form. This thrust, however, is only generated when the clutch is engaged. If the clutch slips then full thrust is not generated and there is therefore a considerable drop in the actuating force for the clutch and there will be a tendency for the vehicle to roll forwards, if it is on a hill facing downwards and reverse has been selected, until such time as the clutch slip ceases.

It is an object of the present invention to provide an epicyclic gear change assembly for use as auxiliary ratio change means for a motor vehicle, in which a positive mechanical drive is established in direct drive if there is a tendency for the clutch to slip.

SUMMARY OF THE INVENTION

According to the invention we provide an epicyclic gear change assembly comprising: a casing; an epicyclic gearing having three members viz, a sun gear, an annular gear, and a planet gear carrier carrying planet gears or planet gear clusters which mesh with the sun and annulus gears, the meshing teeth of the gears being of helical form; a friction clutch having an engaged stage in which it frictionally connects two of said members together for rotation and a disengaged stage in which said two members can rotate relatively to one another; locking means for positively locking together two of said members for rotation, said locking means comprising first and second inter-engageable elements relatively movable in directions parallel to the axis of rotation of the sun gear and when engaged locking said members together; spring means for releasably holding said elements out of engagement; said locking means being arranged so that when power is transmitted through the assembly in a predetermined direction and rotational sense the thrust due to the helical form of the teeth tends to engage said elements; actuating means for the clutch and the locking means and selectively operable (1) to disengage the elements and the clutch and (2) to engage the clutch and to allow said thrust to act on the elements to engage them; and brake means for holding one of the elements of the gearing against rotation relative to the casing with the interengageable elements disengaged.

When we refer to the direction of power transmission we mean to refer to the direction of power flow from an input to an output. If the epicyclic gear assembly is used as an auxiliary ratio change means in a motor vehicle then the direction of power transmission will normally be from the engine to the driving wheels of the vehicle and it is when the power transmission is in this direction and in said predetermined rotational sense, i.e. reverse, that operation of the locking means will be arranged to occur to prevent slipping. In overrun, the driving wheels tend to drive the gearing and thus the power transmission is in the opposite direction and in this condition also, when the vehicle is travelling forward, the locking means may operate. When we refer to rotational sense, we refer to the rotational sense of the input to the gear assembly.

In the circumstances mentioned above, where a gear change assembly embodying the invention is used as an auxiliary ratio change means for a motor vehicle and the vehicle is brought to rest in overdrive ratio and reverse is then selected in the main change speed gear box, the brake holding the reaction member of the epicyclic gearing is disengaged and the clutch between the two members of the gearing is engaged. When power applied from the engine, and clutch, although engaged, will slip until such time as it has managed to dispose of the oil on the clutch surfaces. Some torque will, however, be transmitted by the clutch and thus there will be a thrust due to the helical form of the gear teeth and this thrust will be such as to overcome the spring means and to cause inter-engagement of the elements thus positively locking together the two members between which the elements act thus giving a positive lock direct drive. Since the thrust will not be generated until some torque has been transmitted by the clutch the clutch will, in effect, act as a synchroniser so as to enable the elements to inter-engage without clashing. Moreover, the engagement of the clutch will not automatically cause the elements to inter-engage until some torque is being transmitted thus to generate thrust which will cause the elements to inter-engage.

The actuating means may be arranged to cause disengagement of the elements and the clutch in synchronism. In such an assembly there may be included a sleeve carrying a control member which is fixed relative to the sleeve and which in turn carries part of the friction clutch, the sleeve being movable axially by the actuating means, the sun gear being slidable on the sleeve in directions parallel to said axis while being keyed to rotate with the sleeve, and the sun gear having the first inter-engageable elements thereon. Conveniently these inter-engaging elements are the gear teeth of the sun gear.

In this construction, the spring means preferably act between the sun gear and the sleeve. The spring means may be in the form of one or more leaf springs received in grooves in the outer surface of the sleeve and arranged to engage releasably in a recess in the bore of the sun gear.

The actuating means may be operated by fluid pressure to carry out both of operations (1) and (2) on the clutch and locking means.

This arrangement is satisfactory where it is possible to have a comparatively long travel of the control member which is moved to disengage the clutch and the elements, e.g. on a commercial vehicle. On such a vehicle it is also possible to use compressed air to effect the movement of the control member in both directions, i.e. to change from direct drive to overdrive ratio and vice-versa.

In an assembly embodying the invention for use in a private passenger vehicle, however, there is usually no supply of compressed air available and in a conventional overdrive assembly a spring is used to urge the control member to a position in which the clutch is engaged to select direct drive, a hydraulic piston and cylinder assembly being used to move the control member to select overdrive ratio.

If the travel of the control member is relatively long then difficulties are encountered in providing a spring of the correct rate to urge the control member into the position to select direct drive. Moreover, the time taken for the control member to move to the direct drive position from the overdrive position could be too long so that there would be an appreciable time during which the vehicle would free-wheel during ratio change from overdrive ratio to direct drive.

In an alternative arrangement, therefore, the actuating means is selectively operable to (1) disengage the elements and clutch in succession so that disengagement of the elements is followed by disengagement of the clutch and (2) to engage the clutch and to allow said thrust to engage the elements.

Preferably the sun gear is formed in one piece with, or is rigidly secured to, a sleeve which is movable axially by the actuating means and on which is mounted a control member carrying part of the clutch, the control member being rotatable with the sleeve but slidable axially relative thereto, the sun gear or sleeve having the first interengageable elements. Upon engagement and disengagement of the elements of the locking means, relative axial movement will take place between the sleeve and the control member. Thus disengagement of the elements can occur before the clutch is disengaged due to the relative axial movement which takes place between the control member and the sleeve and this in turn enables the clutch travel to be shorter than in the arrangement described above in which the travel of the control member is equal, upon disengagement of the elements, to the travel of the elements associated with the sun gear.

Preferably the actuating means includes an actuator spring which urges the clutch to its engaged position and said spring acts on the control member. Preferably, also, there is fluid-pressure-operable means to move the control member to a clutch-disengaged position.

Preferably, the friction clutch acts between the same two members of the epicyclic gearing as do the inter-engaging elements of the locking means but this is not essential.

Preferably it is the sun gear which is arranged to be held against rotation relative to the casing by the brake means. Preferably, the sleeve, where provided, and the sun gear are held against rotation by a friction brake which constitutes the brake means and is interposed between the sleeve and the casing.

In such an arrangement the control member preferably carries not only a part of the clutch but also a part of the brake.

In the arrangement in which the control means is fixed relative to the sleeve, the brake may form part of the actuating means so that when engaged it holds the sleeve in position such that the elements are disengaged. Where the control member can slide relative to the sleeve the actuating means preferably acts directly on the sleeve.

In a preferred construction a one-way clutch is provided between members of the gearing to transmit substantially the whole of the torque through the gearing when the latter is in a direct drive and power is transmitted in said predetermined direction but in the opposite rotational sense. Considered in the form of an epicyclic gear change assembly for a motor vehicle, the one way clutch transmits substantially the whole of the torque in direct drive when the vehicle is moving forward under power, this relieves the loading on the friction clutch.

BRIEF DESCRIPTION OF THE DRAWINGS

The invention will now be described in detail by way of example with reference to the accompanying drawings in which:

FIG. 1 is a partial cross-sectional view through an epicyclic gear change assembly constituting a first embodiment of the invention shown in a direct drive condition with the inter-engaging elements engaged;

FIG. 2 is a detail view of the assembly of FIG. 1 showing the normal position of the sun gear on the sleeve with the inter-engaging elements disengaged.

DESCRIPTION OF THE PREFERRED EMBODIMENTS

Figure 3:
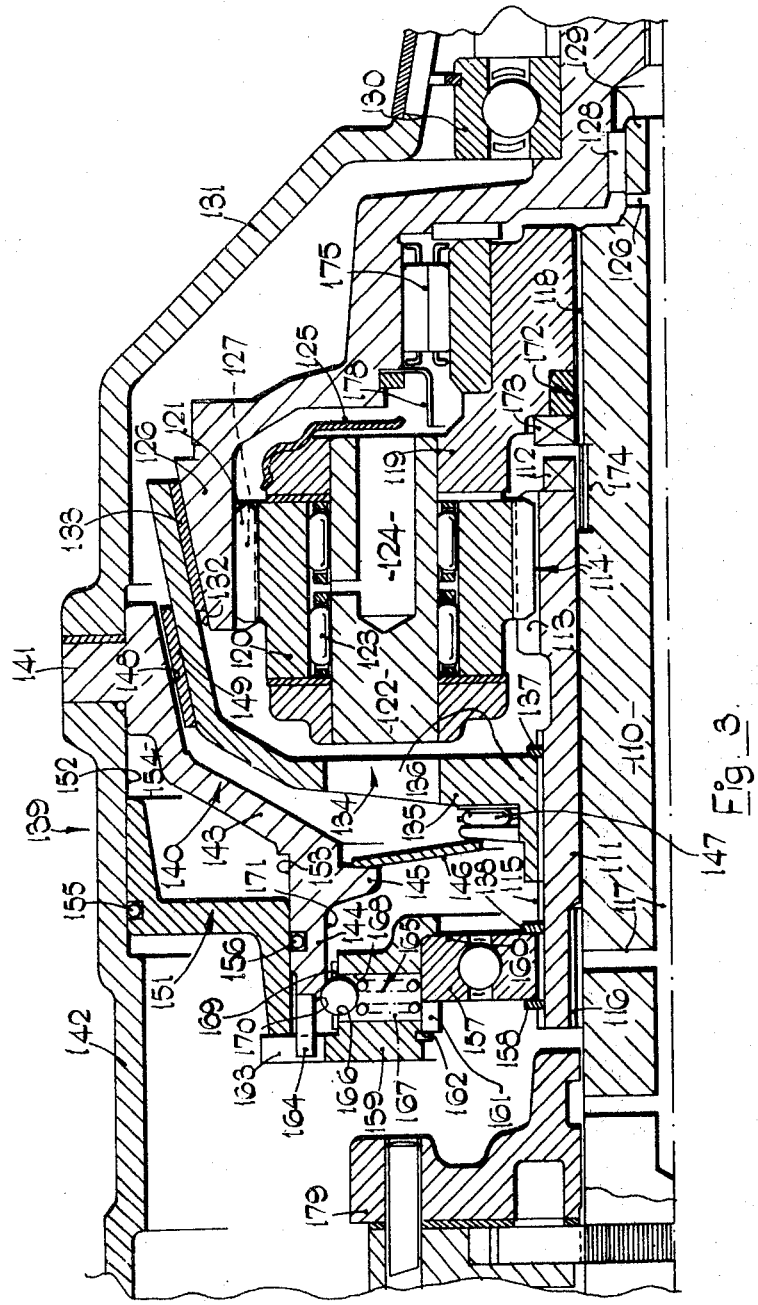
FIG. 3 is a partial cross-sectional view through an epicyclic gear change assembly constituting a second embodiment of the invention shown in direct drive with the elements of the locking means disengaged.

Referring now to FIGS. 1 and 2 of the drawings, the gear comprises an input shaft 10 on which is freely, rotatably mounted a sleeve 11. The sleeve has external splines 12 and on it is mounted an internally-splined sun gear 13. The sun gear is provided with teeth 14 of helical form. An annular recess 15 is formed in the bore of the sun gear and is arranged to engage a number of leaf springs 16 received in grooves 17 in the sleeve 11. The springs 16 releasably hold the sun geear in the position shown in FIG. 2 relative to the sleeve 11 when the springs 16 are received in the recess 15. As will be described below, thrust due to the tooth form of the gears can move the sun gear to the right relative to the sleeve 11 as shown in FIG. 1 against the action of the springs 16.

Splined to the input shaft 10 is a planet carrier 18 on which are mounted planet gears, one of which is indicated at 19, which have teeth of helical form. The planet carrier is provided with pivot pins 20 for the planet gears and a bearing 21 surrounds each pivot pin to support the planet gear thereon. The planet carrier is provided with an annular array of gear teeth 22 which are capable of meshing with the teeth 14 of the sun gear as shown in FIG. 1.

The third member of the epicyclic gearing is the annulus gear 23 which is supported in the casing of the assembly by bearings, not shown. The annulus gear provides the output of the assembly and carries a bearing 24 in which the input shaft 10 is supported. The annulus gear has helical teeth 25 which mesh with the teeth of the planet gears 19. The outer surface 26 of the annulus gear is frusto-conical and provides a clutch surface for engagement by a friction lining 27 carried by a control member indicated generally at 28. The control member comprises a flange 29 which is provided with an internally splined boss 30 which is received on the splines 12 of the sleeve 11. The control member is located axially of the sleeve 11 by means of circlips 31 and 32. The control member 28 is therefore both rotationally and axially fixed to the sleeve 11. The sleeve 11 also carries a circlip 33 adjacent the end remote from the boss 30 and the circlip 33 performs a function in relation to moving the sun gear as will be described below.

The casing of the assembly is indicated at 34 and a multi-plate brake indicated generally at 35 is interposed between the control member 28 and the casing 34. The internal surface of the housing 34 is splined at 36 and received on the splines are discs 37, the discs being slidable along the splines. A brake part 38 is also received on the splines 36 but is prevented from moving to the left by a circlip 39. The outer periphery of the control member 28 is splined at 40 and carries discs 41 which are provided with friction linings, some of which are indicated at 42. A circlip 43 prevents the right hand disc 41 from moving to the right and the splines 40 are reduced in diameter at their right hand ends as at 40a so that a shoulder 40b is formed against which the right hand disc 41 is held by the circlip 43.

Mounted in the casing 34 is an annular piston 44 and pressure fluid, e.g. compressed air, can be introduced into the space 45 to urge the piston 44 to the left thus forcing the discs 37 and 41 together between the piston 44 and the brake part 38 thus to apply the brake and hold the control member 28 against rotation thus holding the sleeve 11 and the sun wheel 13 against rotation. The control member 28 and sleeve 11 are moved to the left by the piston 44 when this is moved to apply the brake due to the engagement of the right hand disc 41 with the shoulder 40b.

An annular piston 46 is arranged in the left hand end of the casing and at its inner end 47 it engages a bearing 48 which is interposed between the piston 46 and the flange 29 of the control member 28. Pressure fluid, e.g. compressed air, may be introduced into the space 49 thus to urge the piston 46 to the right in the figure thus moving the control member 28 to the right and engaging the friction lining 27 with the frusto-conical surface 26 of the annulus gear 23.

A one way clutch 50 is provided between the planet carrier 18 and the annulus gear 23.

The operation of the assembly will now be described, first in overdrive ratio.

OVERDRIVE RATIO

To obtain overdrive ratio, pressure fluid is introduced into the space 45 thus moving the piston 44 to the left and thus bringing the control member 28 to rest by engaging the brake 35. The space 49 is connected to exhaust and the sleeve 11 moves as a whole, under the influence of the piston 44, to the left. Assuming that the sun gear is in the position shown in FIG. 1 prior to the engagement of overdrive ratio, the circlip 33 will engage the right hand end of the sun gear 13 and, as the sleeve 11 moves to the left, the circlip 33 will move the sun gear 13 to the left thus disengaging the teeth 14 of the sun gear from the teeth 22 on the planet carrier. The planet carrier can thus rotate relative to the sun gear. The sun gear is held against rotation and therefore the assembly is in planetary ratio, rotation of the input shaft 10 causing rotation of the annulus gear 23 at a greater rotational speed than that of the input shaft.

When the gear change assembly is mounted in a vehicle having a main change speed gear box, overdrive ratio can only be selected when the forward ratios are selected in the main change speed gear box. In forward drive, when power is being transmitted from the input shaft 10 to the annulus gear 23 the thrust due to the helical formation of the gear teeth will be to the left in the drawings. The sun gear 13 will thus move relative to the sleeve 11 to the position shown in FIG. 2 and the sun gear thrust due to its helical teeth will act through the circlip 32 onto the control member 28 and will augment the pneumatic force on the piston 44 to hold the brake 35 engaged.

In overrun, i.e. when power is being transmitted from the annulus gears 23 to the shaft 10, the thrust of the sun gear will be in the opposite direction, i.e. to the right. If the thrust force is of sufficient magnitude to overcome the springs 16 the sun gear will move into engagement with the circlip 33 but, since the sleeve 11 has been moved with the control member 28 to the left from the position shown in FIG. 1, the circlip 33 will prevent the teeth 14 on the sun gear engaging with the teeth 22 on the planet carrier.

DIRECT DRIVE

To engage direct drive, the space 45 is connected to exhaust and the space 49 is connected to a source of pressure fluid and moves the piston 46 and thus, through the bearing 48, the control member 28 to the right to the position shown in FIGS. 1 and 2.

If the vehicle has previously been in overdrive ratio with power being transmitted from the input shaft 10 to the annulus gear 23 the sun gear 13 would be in the position, relative to the sleeve 11, as shown in FIG. 2, being releasably held in this position by the springs 16.

The movement of the control member 28 to the right will cause frictional engagement between the friction lining 27 and the frusto-conical surface 26 on the annulus gear 23 and will thus give direct drive. During forward movement of the vehicle, substantially all the torque is taken through the one way clutch 50 so that there is substantially no torque being transmitted via the gears. If there is any torque being transmitted, however, the thrust of the sun gear during forward drive will be to the left and it will have a slight tendency to unload the clutch 26, 27. It is for this reason that the one way clutch 50 is preferably provided. However it is within the scope of the invention to omit a one way clutch such as 50 but it would be necessary to increase the power which could be applied to the piston 46 to hold the clutch 26, 27 in engagement.

The springs 16 prevent axial "chatter" of the sun wheel during normal operation. If the vehicle goes into overrun the thrust of the sun gear will be to the right and there will be a tendency for the sun gear to move to the right relative to the sleeve 11 to the position shown in FIG. 1 where the teeth 14 of the sun gear engage the teeth 22 on the planet carrier 18. Since the sun gear and the planet carrier will be rotating at the same speed the teeth may or may not engage but it is not an essential part of the arrangement that they do unless there is slipping between the friction lining 27 and the frusto-conical surface 26. In this case there will be some slight relative rotation between the sun gear and the planet carrier and the teeth 14 of the sun gear will be enabled to engage with the teeth 22 on the planet carrier.

The main purpose of the provision of the teeth 22 on the planet carrier, however, is to overcome the effect of the clutch 26, 27 slipping when reverse is selected after the vehicle has been brought to rest in overdrive ratio. Assuming that this has taken place, when reverse is selected the space 45 will be connected to exhaust and the space 49 will be pressurized. The friction lining 27 will be brought into engagement with the surface 26. However there will be oil on the surface 26 and when power is applied there will be a tendency for the lining 27 to slip relative to the clutch 26. Assuming, however, that some torque is being transmitted between the parts 27 and 26 there will be some thrust on the sun gear 13 which will tend to move to the right so that its teeth 14 engage with the teeth 22 of the planet carrier. Since some torque is being transmitted by the clutch 26, 27 the clutch acts as a synchroniser so that the sun gear and the planet carrier are rotating at substantially the same speed and this enables the teeth 14 to mesh with the teeth 22 without clashing. Should the teeth tend to block one another as the sun gear 13 moves to the right, the teeth will clear as slip occurs between the parts 26, 27.

It will be seen from the foregoing, therefore, that when reverse is selected, if there is a tendency for the clutch 26, 27 to slip there will be positive engagement between the teeth 14 and 22 thus giving a positive direct drive connection.

Should the change to overdrive ratio be effected while the sun gear 13 is engaged with the teeth 22, as the sleeve 11 moves to the left the circlip 33 will pull the sun gear out of engagement with the teeth 22.

Referring now to FIG. 3, the gear change assembly there shown comprises an input shaft 110 on which is freely, rotatably mounted a sleeve 111. At its right hand end the sleeve has axially projecting teeth 112 and is also formed with helical teeth 113 which constitute the sun gear 114 of the assembly. The sun gear is thus formed integrally with the sleeve 111 but it could, in an alternative construction, be rigidly secured to the sleeve 111. The left hand end portion of the sleeve is externally splined at 115 and is internally bored at 116 to provide an oil passage to receive oil from lubrication passages 117 in the shaft 110.

Splined to the input shaft 110 at 118 is a planet carrier 119. Mounted on the planet carrier are a number of planet gears, one of which is indicated at 120, the planet gears having helical teeth 121 which mesh with the teeth 113 on the sun gear 114. Each planet gear is mounted on a pivot pin 122 and a bearing 123 surrounding the pin. Each pivot pin is provided with lubrication passages 124 into which oil is directed by a collector ring 125.

The third member of the epicyclic gear is the annulus gear 126 which is provided with helical teeth 127 which mesh with the teeth 121 of the planet gears 120. A bearing 128 in the annulus gear supports one end of the input shaft 110. The annulus gear is supported on further bearings one of which 130 is shown mounted in a casing part 131. The output from the gear change assembly is taken from the annulus gear.

The outer surface 132 of the annulus gear is frusto-conical and provides a clutch surface for engagement by a friction lining 133 carried by a control member indicated generally at 134. The control member comprises a flange 135 with an internally splined boss 136 which is received on the splines 115 of the sleeve 111. The control member and the sleeve can have relative axial movement which is limited by the control member engaging circlips 137 and 138 on the sleeve 111. The control member is, however, keyed to rotate with the sleeve by the splined connection therewith.

The casing, which is indicated generally at 139 includes, in addition to the casing part 131, a further casing part indicated generally at 140. The part 140 has a flange 141 which is received between the casing part 131 and a further casing part 142. The casing part 140 has an inclined inwardly directed flange 143 and a generally cylindrical extension 144. Extending inwardly from the extension 144 is a peripheral rib 145 which provides an abutment for one edge of a belleville spring 146. The other, inner edge of the spring engages a thrust bearing 147 received on the boss 136 so that the spring 146 urges the control member 134 to the right in the drawing.

The casing part 140 is provided with an internal frustoconical surface 148 which can be engaged by a friction lining 149 on the external surface of the control member 134, the surface 148 and the lining 149 constitute a brake whereby the sun gear 114 can be held against rotation to give a planetary ratio.

An annular piston indicated generally at 151 of Z-shape in cross section is received in a cylinder formed between an internal cylindrical surface 152 on the casing part 142 and an external cylindrical surface 153 on the casing part 140. The cylinder is indicated generally at 154. A ring seal 155 is carried by the piston 151 and there is a further ring seal 156 inset in the surface 153 to engage the piston 151. Means, not shown, is provided for admitting hydraulic pressure fluid to the cylinder 154 and for exhausting such fluid.

A bearing 157 is located on the sleeve 111 between the circlip 138 and a further circlip 158. The bearing is held in an external housing 159 against a shoulder 160 by means of a spacer 161 and circlip 162. The bearing housing has an external flange 163 which abuts the piston 151, the flange 163 being slotted to receive a number of projections, one of which is shown at 164, on the casing part 140 thus to prevent rotation of the bearing housing 159.

The bearing housing 159 contains a number of spring loaded detents, one of which is indicated at 165. Each detent comprises a ball 166 which is urged outwardly by a compression spring 167 located in a bore 168 in the housing. Each ball 166 is retained in the housing by means of an apertured plate 169 and with the sleeve 111 in the position shown in FIG. 3 the balls engages an inclined surface 170 on the casing part 140 and thus releasably holds the sleeve 111 against movement to the right in the drawing. The sleeve 111 can move to the right if the balls 166 are moved inwardly against the action of their aprings 167 so that each ball comes into contact with the inner cylindrical surface 171 on the casing part 140.

The projection 164 and the detent 165 have been shown in the drawing in the same plane but they will, in fact, be circumferentially staggered around the periphery of the bearing housing 159.

Referring once more to the planet carrier 119, this is provided with an insert indicated generally at 172 which provides axially extending gear teeth 73 which can engage with the gear teeth 112 on the right hand end of the sleeve 111. The insert is a press fit into the planet carrier and is internally splined to engage the splines on the input shaft 110. A spring clip 174 surrounds the input shaft and holds the planet carrier against movement to the left.

A one-way clutch 175 is interposed between the planet carrier and the annulus gear and this is lubricated by oil which is expelled from the passage 176 in the input shaft 110 and moves outwardly through the space 177 into the clutch 175. The oil then engages a thrower 178 which directs the oil into the collector ring 125.

At its left hand end, the input shaft 110 picks up lubricating oil from a cavity in a pedestal 179 forming part of the housing.

The operation of the gear change assembly will now be described, first in overdrive ratio.

OVERDRIVE RATIO

To select overdrive ratio, hydraulic fluid is introduced into the cylinder 154 thus moving the piston 151 to the left. The piston will engage the flange 163 of the bearing housing 159 and, via the bearing 157, will move the sleeve 111 to the left. The circlip 137 will, also ensure that the control member 134 is moved to the left, this movement being against the action of the spring 146. As the control member 34 moves to the left the brake 148, 149 will be engaged and the clutch 132, 133 will be disengaged. The sun gear will be brought to rest by operation of the brake 148 and 149. The position of the sleeve 111 required to engage the brake 148. 149 will be such that the teeth 112, 173 are out of engagement. The planet carrier can thus rotate relative to the sun gear and, since the latter is held against rotation, the gear assembly is in planetary ratio, rotation of the input shaft 110 causing rotation of the annulus gear 126 at a greater rotational speed than that of the input shaft.

When the gear change assembly is mounted in a vehicle, overdrive ratio can only be selected when the forward ratios are selected in the main change speed gear box. For forward drive, therefore, when power is being transmitted from the input shaft 110 to the annulus gear 126 the thrust due to the helical formation of the gear teeth will be to the left in the drawing. The sun gear 114 will thus tend to move to the left and the sun gear thrust will act through the circlip 137 on the control member 134 and will augment the hydraulic force on the piston 151 to hold the brake 148, 149 engaged.

In overrun, i.e. when power is being transmitted from the annulus gear 126 to the shaft 110, the thrust on the sun gear will be in the opposite direction and the sun gear will tend to move to the right but, since the piston 151 holds the bearing 157 to the left, the circlip 158 will prevent the sun gear moving to a position in which the teeth 112 on the sun gear can engage with the teeth 173 on the planet carrier.

DIRECT DRIVE

To engage direct drive, the cylinder 154 is connected to exhaust. The shift quality will be controlled by controlling the rate at which the hydraulic fluid is allowed to exhaust from the cylinder 154. The spring 146 will urge the control member 134 to the right in the drawing thus disengaging the brake 148, 149 and engaging the clutch 132, 133. The sleeve 111 will also be moved to the right to the position shown in the drawing by engagement of the control member 134 with the circlip 137. The gear change assembly will now be in direct drive.

During forward movement of the vehicle under power, substantially all the torque will be taken through the one way clutch 175 so that there is substantially no torque being transmitted via the gears. If any driving torque is being transmitted by the gears, however, thrust on the sun gear during forward drive will be to the left and will have a slight tendency to unload the clutch 132, 133. It is for this reason that the one way clutch 175 is provided but it is within the scope of the invention to increase the strength of the spring 146 or to provide a fluid pressure operated actuator to move the control member to its direct drive ratio position so that the one way clutch 175 could be omitted.

The detents 165 prevent axial "chatter" of the sun wheel sleeve 111 during normal operation. If the vehicle goes into overrun, however, the thrust on the sun wheel 114 will be to the right and there will be a tendency for the sun wheel sleeve 111 to move to the right from the position shown in the drawing so that if the thrust is sufficient to overcome the load of the detents 165 the teeth 112 of the sun gear will tend to engage the teeth 173 on the planet carrier 119. Since the sun gear and the planet carrier will be rotating at the same speed the teeth may or may not engage but it is not an esential part of the arrangement that they do unless there is slipping between the friction lining 133 and the frusto-conical surface 132. In this case there will be some slight relative rotation between the sun gear and the planet carrier and the teeth 112 on the sun gear will be enabled to engage with the teeth 173 on the planet carrier.

The main purpose of the provision of the teeth 112 and 173, however, is to overcome the effect of the clutch 132, 133 slipping when reverse is selected after the vehicle has been brought to rest in overdrive ratio. Assuming that this has taken place, when reverse is selected the cylinder 154 will be connected to exhaust. The spring 146 will bring the friction lining 133 into engagement with the surface 132. However there will be oil on the surface 132 and when power is applied there will be a tendency for the lining 133 to slip relative to the surface 132. Assuming, however, that some torque is being transmitted between the parts 132 and 133 there will be some thrust on the sun gear 114 which will tend to move to the right so that the teeth 112 engage with the teeth 173 on the planet carrier. Since some torque is being transmitted by the clutch 32, 33 the clutch acts as a synchroniser so that the sun gear and the planet carrier are rotating at substantially the same speed and this enables the teeth 112 to mesh with the teeth 173 without clashing. Should the teeth tend to block one another as the sun gear 114 moves to the right, the teeth will clear as slip occurs between the clutch 132, 133.

It will be seen from the foregoing, therefore, that when reverse is selected, if there is a tendency for the clutch 132, 133 to slip there will be positive engagement between the teeth 112 and 173 thus giving a positive direct drive connection.

If it is desired to select overdrive ratio while the teeth 112 and 173 are engaged, hydraulic fluid will be introduced into the cylinder 154 which will move the piston 151 to the left. When the teeth 112 and 173 are in engagement the boss 136 on the control member will be spaced away from the circlip 137, i.e. the sleeve 111 will have moved to the right relative to the control member 134 from the position shown in the drawing. The first effect, therefore, of pressurising the cylinder 154 will be to move the sleeve 111 to the left via the flange 163 on the bearing housing 169 and the bearing 157 engaging with the circlip 158 on the sleeve 111. The sleeve 111 will thus move to the position shown in the drawing with the teeth 112 and 173 disengaged while leaving the clutch 132, 133 engaged. Further movement of the sleeve 111 to the left from the position shown in the figure will cause the control member 134 to move to the left thus disengaging the clutch 132, 133 and engaging the brake 148, 149.

It will be seen, therefore, that disengagement of the teeth 112, 173 takes place before disengagement of the clutch 132, 133. It is thus unnecessary for the control member 134 to have the same range of movement as in the embodiment described with reference to FIGS. 1 and 2 where the control member 28 and the sun gear sleeve 111 are rigidly connected together so that both had to move through the same distance upon disengagement of the teeth 14 and 22 and the sun gear 13 also had to move the same distance as the control member. The travel of the control member 134 between the position in which the brake 148, 149 is engaged and the position in which the clutch 132, 133 is engaged can thus be within the conventional range of movement of the order of 1/16 inch which can easily be handled by the spring 146.

It will be seen, therefore, that where only a small range of movement of the control member is acceptable because e.g. of the need to use a spring such as 146 to engage direct drive, the arrangement shown in FIG. 3 is preferred to that shown in FIGS. 1 and 2 in which the range of movement of the control member is greater and is effected by fluid pressure in both directions.

The invention is particularly useful in connection with an epicyclic gear change assembly used as an auxiliary ratio-change means for a motor vehicle but the invention can be embodied in epicyclic gear change assemblies for other purposes. Moreover, although the invention has been described specifically in relation to an overdrive arrangement it could also be used with an underdrive arrangement. In such an arrangement the annulus gear would be the input and the planet carrier would be the output.

I claim:

1. An epicyclic gear change assembly comprising: a casing; an epicyclic gearing having three members viz., a sun gear, an annulus gear, and a planet gear carrier carrying planet gears or planet gear clusters which mesh with the sun and annulus gears, the meshing teeth of the gears being of helical form; a friction clutch having an engaged stage in which it frictionally connects two of said members together for rotation and a disengaged stage in which said two members can rotate relatively to one another; locking means for positively locking together two of said members for rotation, said locking means comprising first and second inter-engageable elements relatively movable in directions parallel to the axis of rotation of the sun gear and when engaged locking said members together; spring means for releasably holding said elements out of engagement; said locking means being arranged so that when power is transmitted through the assembly in a predetermined direction and rotational sense the thrust due to the helical form of the teeth automatically tends to displace said elements relatively toward each other in order to engage said elements; actuating means for the clutch and the locking means and selectively operable (1) to disengage the elements and the clutch and (2) to engage the clutch and to allow said thrust to act on the elements to engage them; and brake means for holding one of the elements of the gearing against rotation relative to the casing with the inter-engageable elements disengaged.

2. An assembly according to claim 1 in which the actuating means are arranged to cause disengagement of the elements and the clutch in synchronism.

3. An assembly according to claim 2 including a sleeve carrying a control member which is fixed relative to the sleeve and which in turn carries part of the friction clutch, the sleeve being movable axially by the actuating means, the sun gear being slidable on the sleeve in directions parallel to said axis while being keyed to rotate with the sleeve and the sun gear having the first interengageable elements thereon.

4. An assembly according to claim 3 wherein the spring means is in the form of one or more leaf springs received in grooves in the outer surface of the sleeve and arranged to engage releasably in a recess in the bore of the sun gear.

5. An assembly according to claim 1 wherein the actuating means is selectively operable to (1) disengage the elements and clutch in succession so that disengagement of the elements is followed by disengagement of the clutch and (2) to engage the clutch and allow said thrust to engage the elements.

6. An assembly according to claim 5 wherein the sun gear is formed in one piece with, or is rigidly secured to, a sleeve which is movable axially by the actuating means and on which is mounted a control member carrying part of the clutch, the control member being rotatable with the sleeve but slidable axially relative thereto, the sun gear or sleeve having the first interengageable elements.

* * * * *